United States Patent [19]

Corliss et al.

[11] 3,921,667
[45] Nov. 25, 1975

[54] BATTERY OPERATED, FLUID PRESSURE RESPONSIVE VALVE CONTROLLER

[75] Inventors: Robert F. Corliss, Hacienda Heights; Frank Wilkinson, Monrovia, both of Calif.

[73] Assignee: Tyme Valve Corporation, South El Monte, Calif.

[22] Filed: Aug. 7, 1973

[21] Appl. No.: 386,395

Related U.S. Application Data

[63] Continuation-in-part of Ser. No. 216,397, Jan. 10, 1972, abandoned.

[52] U.S. Cl. ............... 137/624.15; 239/70; 251/45
[51] Int. Cl.² ............................................ F16K 31/36
[58] Field of Search..... 137/624.11, 624.13, 624.15, 137/624.17, 624.14, 624.18, 624.2; 251/30, 133, 25, 45; 239/70

[56] References Cited
UNITED STATES PATENTS

| | | | |
|---|---|---|---|
| 2,674,490 | 4/1954 | Richards | 137/624.13 X |
| 2,821,434 | 11/1958 | Hunter | 137/624.13 X |
| 3,008,682 | 11/1961 | Filliring | 251/30 X |
| 3,112,094 | 11/1963 | Nees | 251/30 |
| 3,345,915 | 10/1967 | Dotto | 137/624.13 X |
| 3,410,301 | 11/1968 | Merriner | 251/30 X |
| 3,589,563 | 6/1971 | Carragan | 239/70 X |
| 3,720,232 | 3/1973 | Corless | 137/624.14 |

Primary Examiner—Alan Cohan
Attorney, Agent, or Firm—William W. Haefliger

[57] ABSTRACT

The invention concerns the provision, for use in a pressurized water supply system including a main valve body, of an easily installable flow controller which derives energy for its operation from a dry cell battery. The controller is adapted to be mounted on the valve body and is operable to cycle the movement of the main valve at predetermined time intervals.

14 Claims, 17 Drawing Figures

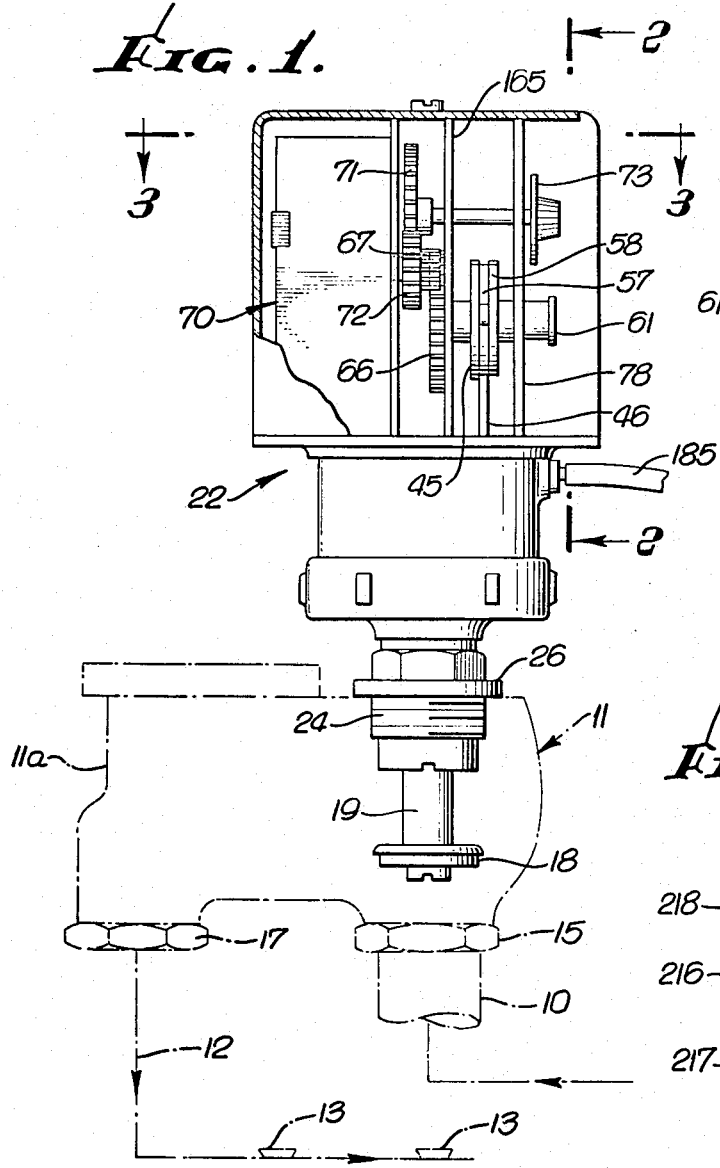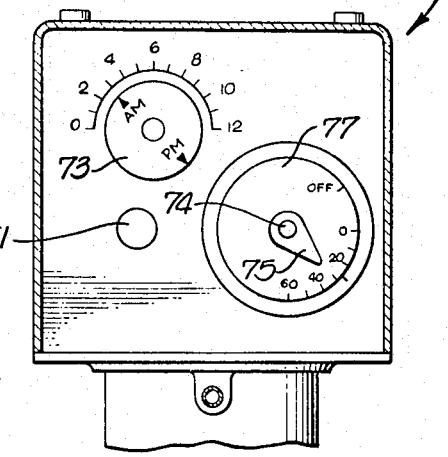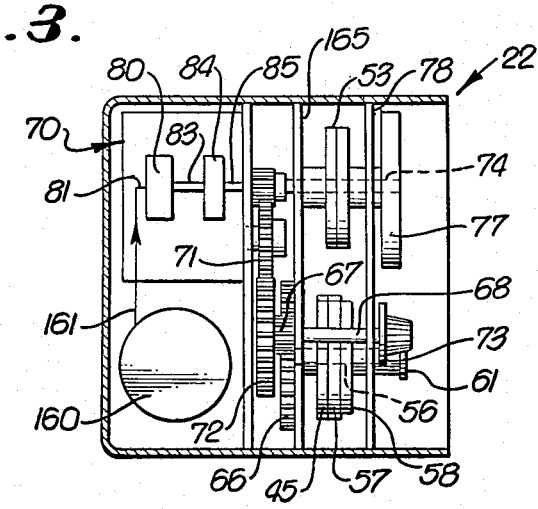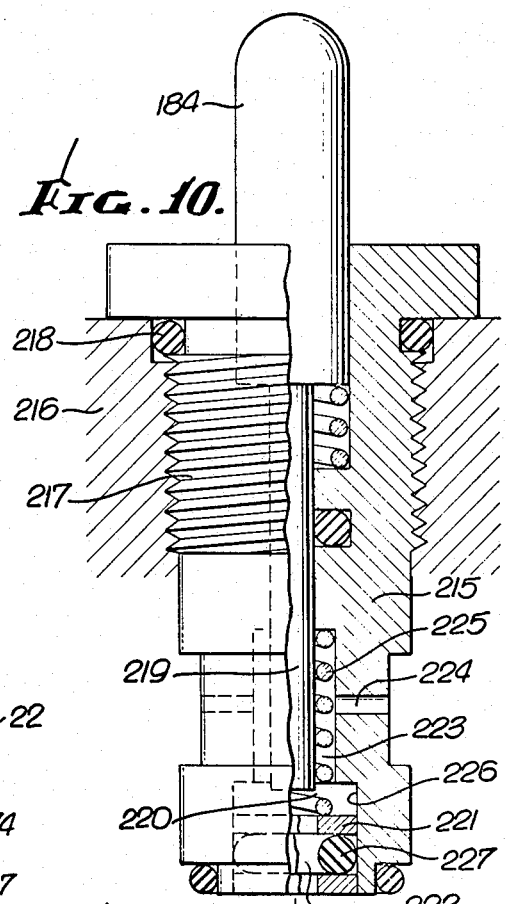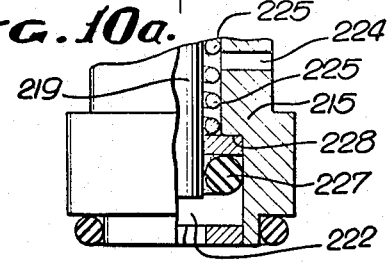

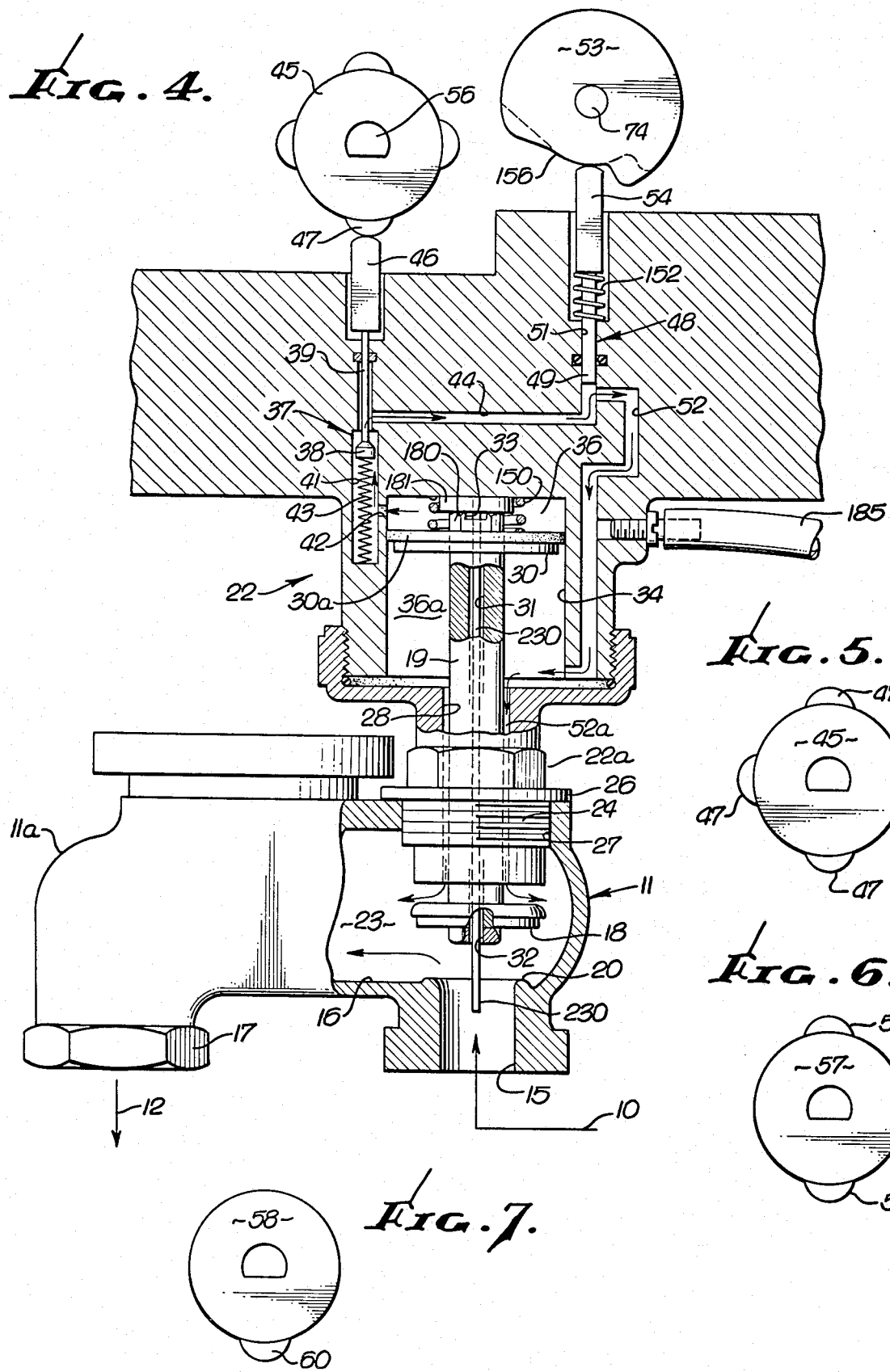

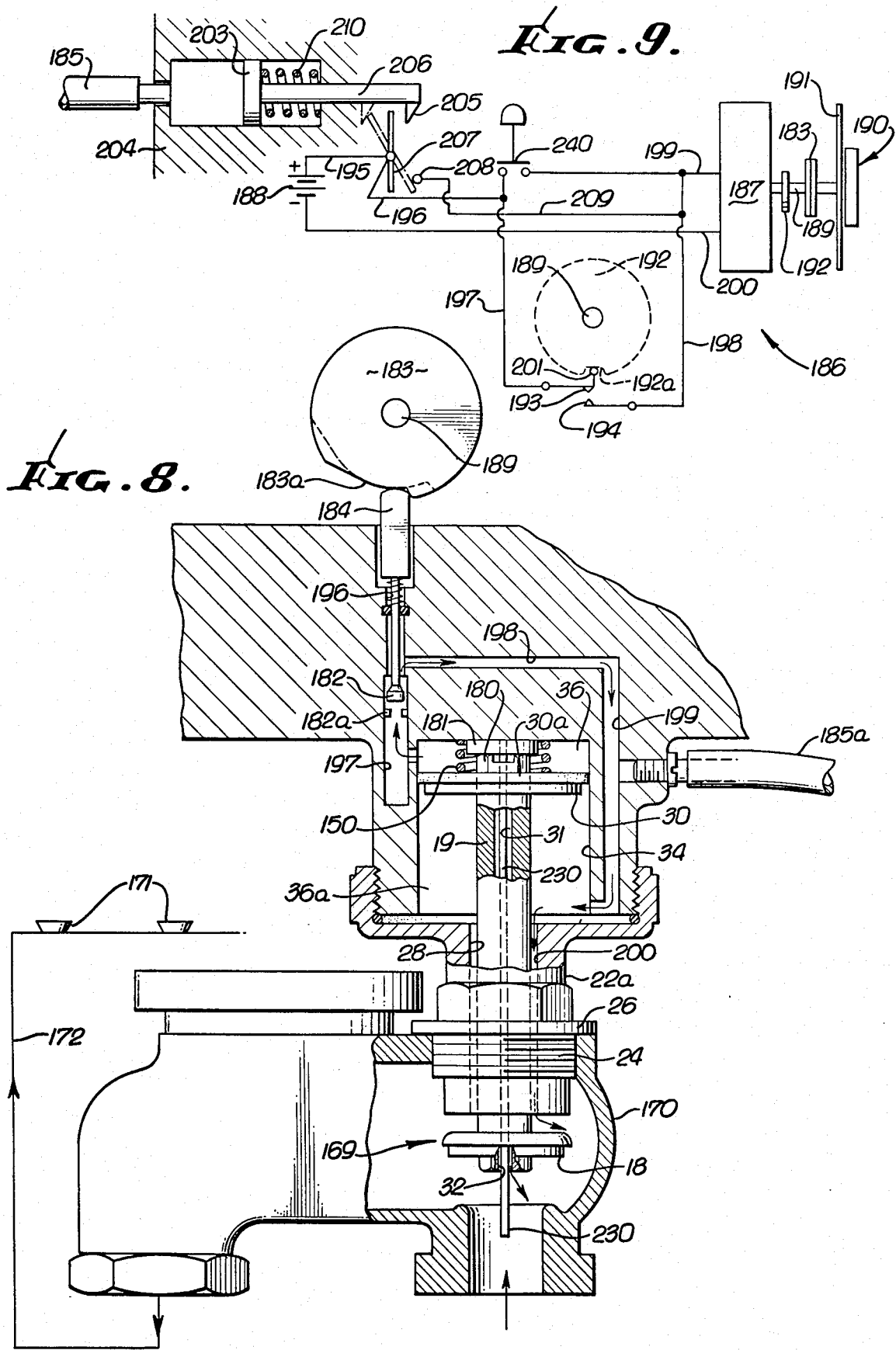

3,921,667

BATTERY OPERATED, FLUID PRESSURE RESPONSIVE VALVE CONTROLLER

This application is a continuation-in-part of our earlier application Ser. No. 216,397 filed Jan. 10, 1972, now abandoned, and entitled, "Battery Operated Fluid Pressure Responsive Valve Controller".

BACKGROUND OF THE INVENTION

This invention relates generally to valve controllers, and more specifically concerns fluid pressure responsive controllers having special application to water supply systems, as for example service lawn or agricultural sprinklers.

In the past, the automatic control of water supply to sprinklers has presented certain problems. These included the requirement of energy supply to the control, and it was thought necessary to utilize electrical energy to operate solenoids and other electrical devices associated with timers and/or water valves. Installation of electrical timers and equipment for such uses is relatively expensive and can lead to problems such as danger of shorting. While efforts have been made to overcome such problems, no controller of which we are aware has provided the unusually advantageous combinations of structure, functioning and results as now are afforded by the present invention.

SUMMARY OF THE INVENTION

It is a major object of the invention to provide, for use in a pressurized water wupply system including a main valve body, an easily installable flow controller which derives energy for its operation from a dry cell battery, and which operates in a simple, unusually effective manner. Accordingly, problems associated with prior controllers are obviated through use of the invention.

It is one major object of the invention to provide a master unit including main valving means having a stopper projecting for installation on and movement in a main valve body to control system water flow through that body; and improved control means adapted to be mounted on the body and operable to cycle the movement of the valving means at predetermined time intervals. The control means includes an actuator piston connected with the stopper and carried to receive application of system water pressure, and control valving communicating with the piston and operable to bleed water pressure supplied to the piston at times when it is in position in which system water pressure urges the stopper and piston to main valve open position; also, the control means includes electrically energized control valve actuating structure. The latter typically includes a rotary cam and follower, and electrical battery energized means to effect rotation of the cam to displace the follower for operating the control valving.

It is another major object to provide for operation of an auxiliary unit, basically like the master unit and operatively connected with the first mentioned control means to cycle the movement of the auxiliary valving means in response to operation of the master unit control means. As will appear, the operative connection is with unusual advantage accomplished in response to changed bleeding of water pressure. As the master unit turns off, back pressure from the sprinkler circuit is diminished, causing a spring return piston to turn on the auxiliary unit. Successive auxiliary units can be turned on in this way, as required.

It is a still further object of the invention to provide for self cleaning of the porting communicating system water pressure to the above mentioned pistons, thereby to prevent clogging of such porting by particles carried in the system water lines. Another object is to provide for bleed water flow to the outlet line (discharge) of the valve.

These and other objects and advantages of the invention, as well as the details of an illustrative embodiment will be more fully understood from the following description and drawings, in which:

DRAWING DESCRIPTION

FIG. 1 is a side elevation showing a controller installed on a main valve body in a water supply system;

FIG. 2 is a side elevation taken on line 2—2 of FIG. 1;

FIG. 3 is a section taken on line 3—3 of FIG. 1;

FIG. 4 is a schematic showing of the operating principles of the controller, representative of a master control unit;

FIGS. 5-7 are views showing various control cams that may be utilized;

FIG. 8 is a schematic showing of the operating principles of another controller, representative of an auxiliary control unit;

FIG. 9 is a diagram of cam control unit for the FIG. 8 controller;

FIG. 10 is an enlarged vertical section taken through a valve usable in FIG. 8;

FIG. 10a is a fragmentary section showing the FIG. 10 valve in closed condition;

DETAILED DESCRIPTION

Figure 11:
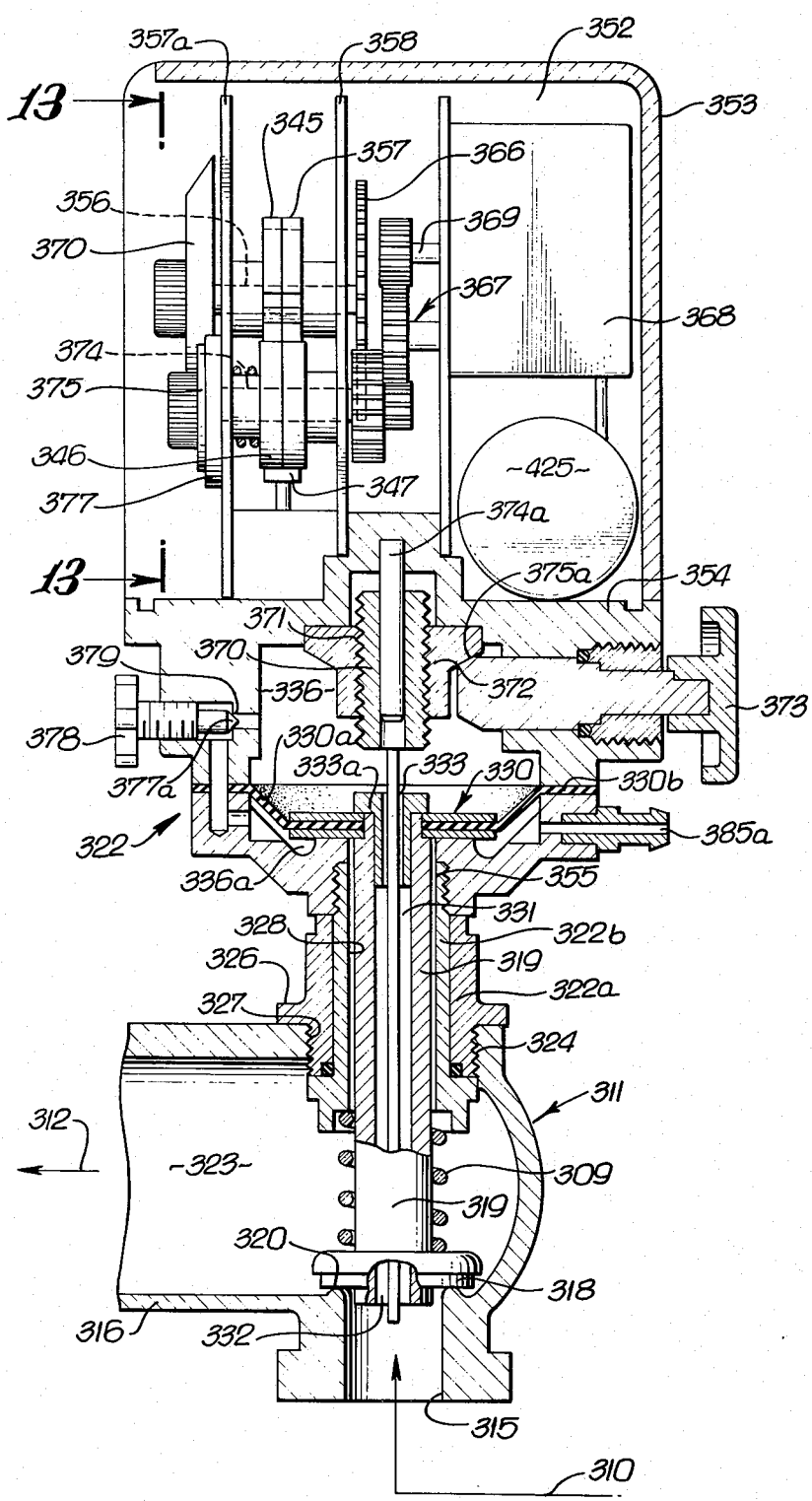
FIG. 11 is a side elevation, in section, showing a modified controller.

In FIGS. 1 and 4, a pressurized water supply system may typically include a pressurized water delivery line 10, a main valve body 11 through which water flow is to be controlled, a line 12 to which water flows from body 11, and water sprinklers 13 connected with line 12. It is understood that line 12 may be connected to outlets other than sprinklers, but that the invention is especially useful in combination with urban or agricultural water sprinklers.

Body 11 may have an inlet 15, an intermediate side outlet 16 and a final outlet 17. Water flow through the inlet 15 to outlet 16 may be controlled by a stopper 18 mounted on a stem 19 for movement toward and away from engagement with an annular seat 20 in body 11. Section 11a of the body may contain conventional antisiphoning means to prevent back flow of contaminated water in line 12 to the supply line 10, which may contain potable water.

A control housing 22 is removably attached to body 11 (after removal of an existing manually actuated stopper and plug); valving means projects from the housing 22 for installation and movement within the body to control water flow in the system; and, control means is carried by the housing 22 and is operable to cycle the movement of the valving means at predetermined time intervals. As a result, very quick and inexpensive installation of the controlled is all all that is needed.

More specifically, the valving means may include the stopper 18 on stem 19, and which is received in the body chamber 23 in response to thread connection at 24 of the housing extension 22a to body 11. Extension 22a is integral with housing 22 and projects therefrom as shown, a flange 26 engaging the body 11. Thus, the controller may be quickly attached to body 11 after removal of a usual cap engaging body thread 27. Extension 22a contains a bore 28 within which stem 19 is vertically movable.

The control means as referred to may advantageously include an actuator piston 30 carried in the housing to receive application of system water pressure, the piston being operatively connected with the stem 19, as for example, being carried thereby. For simplicity, system pressure may be supplied to piston face 30a via passage 31 extending through the stem from inlet 32 to outlet 33; accordingly, system water pressure is always exerted on piston face 30a, so that the piston urges the stopper toward engagement with the seat 20 to maintain the valve in closed position or condition. In this regard, the housing contains a bore 34 within which the piston is movable up and down, a suitable seal being provided at 35.

The piston and stopper also have a main valve opening position or positions, as seen in FIG. 4, and in which system water pressure applied to the stopper urges the stopper, piston, and stem to open position. At such predetermined or controlled times, the water pre-sure exertion on face 30a is reduced, so that the differential pressure exerted on the stopper and piston is in an upward direction. For this purpose, the control means includes control valving communicating with the piston in the housing and operable to bleed water pressure supplied to the piston face 30a. In this regard, the side outlet 33 from the stem bore may act as a flow regulating orifice, dropping the pressure of water flowing via the stem to the chamber 36 to which the piston face 30a is exposed. In the absence of such bleed, water pressure in chamber 36 and return spring 150 urge the piston and stopper to down or closed position.

The referred to control valving is shown to include a first control valve 37 operable to control the slow bleed to occur during selected first time intervals, as for example during a certain interval occuring once each day (or portion thereof), or every other day, or once every forth day, etc. Valve 37 is shown in the form of a poppet 38 on a stem 39 and working in a bore 41 communicating with chamber 36 via duct 42. A spring 43 urges poppet 38 upwardly, and poppet 38 then blanks leakage of water via duct 42 to duct 44. Control valve actuating structure includes a rotary cam 45 and a cam follower 46 on or engaging the stem. The cam is rotated by electrically energized means to displace the follower, as for example, to the bleed position shown.

Valve 37 is operated or displaced to bleed water flow from duct 41 to duct 44. Cam 45 may be a "one-day" cam, meaning that it is rotated a quarter of a turn each day, the follower 46 dwelling on cam lobe 47 once each day and for a predetermined time interval, as for example, 2 hours.

The control valving may also include a second control valve 48 operable to control the bleed to occur during predetermined second time intervals within the first time intervals. Valve 48 is shown in the form of a stopper stem 49 working in bore 51 communicating between duct 44 and discharge duct 52. A spring 152 urges the stem 49 upwardly the stem then passing bleed flow of any fluid in duct 44 to duct 52. Control valve actuating structure includes a rotary cam 53 and a cam follower 54 on the stem. The cam 53 is rotated to displace follower 54, as for example, to the bleed position shown, and water only flows to discharge duct 52 from duct 42 when both valves 37 and 48 are in "bleed" or open position, at which time main valve stopper 18 is in open position. Cam 53 is rotated once every 4 hours, for example, valve 48 being open during a portion of that period corresponding to the length of time follower 54 dwells in cam recess 156. Thus, valve 48 might be open for 5 minutes to 60 minutes each revolution of the cam during the 2 hours that valve 37 is open each day, these times being arbitrarily chosen merely for illustration. From passage 52, bleed water is returned to the chamber 23 via chamber 36a and clearance 52a between stem 19 and bore 28.

Referring back to cam 45, FIG. 3 shows mounting thereof on a shaft 56 in the housing 22, along with alternate cams 57 and 58. The cams also appear in FIGS. 5-7, FIG. 6 showing "2-day" cam 57, and FIG. 7 a "4-day" cam 58. Cam 45 has four lobes 47 and 90° intervals; cam 57 has two lobes 59 and 180° intervals; and cam 58 has one lobe 60. A manually operable plunger 61 may be elevated or depressed at the side of housing 22 to shift the cam group relative to shaft 56 and between three vertical positions, each of which corresponds to positioning of one of the cams in operative relation to plunger 46. Shaft 56 is mounted to a crosspiece 165 in the housing; and also to cross piece 78, and a spur gear 66 on the shaft is rotated by a smaller spur gear 67 on a drive shaft 68. The latter is driven by clock drive mechanism 70, via gears 71 and 72. Shaft 68 may revolve once every 24 hours, for example, and an indicator 73 is rotated relative to the indicia seen in FIG. 2, to indicate the shaft position, hour by hour.

The clock drive also drives shaft 74 to which cam 53 is attached, the drive ratio being such (for example) that shaft 74 may rotate once every 4 hours. Cam 53 may be rotated on the shaft 34, in response to rotation of a watering time duration selector 75, to thereby shift it relative to the follower 54. With the angular extent of the recess 156 varying as a function of axial displacement of the cam 53 (for example) it is clear that the dwell time of the follower 54 in the recess may be controlled, to control the watering time interval, say between 5 and 60 minutes per revolution of the cam 53. Selector 75 also has an "OFF" position as seen in FIG. 2 and corresponding to an axial position of cam 53 in which no recess extent 156 is presented to the follower 54, so that valve 48 does not bleed despite continued rotation of shafts 68, 56 and 74. In this regard, the indicia relative to which selector 75 is turned may be carried on a plate 77 which turns with shaft 74. Cam 53 and selector 75 may be coupled via friction drive mechanism associated with the shaft 74, for example. Note mounting of shaft 74 by cross-pieces 165 and 78, in the housing.

In accordance with a further aspect of the invention, electrical battery energized spring means is operable to transmit force to effect the cycling of the main valve, through operation of the bleed mechanism as described. Referring to FIG. 3, a torsion spring is schematically shown at 80. The spring output at 83 drives escapement mechanism indicated at 84, and the spring and escapement may be considered as embodied in the clock mechanism 70. Escapement output at 85 drives the described cams, as via the shafts and gear trains in FIG. 3.

FIG. 3 also shows a power unit 160 containing an electrical battery and a transducer operable by the battery to develop mechanical pulses transmitted at 161 to the spring input 81 for winding the spring. Such units are known, and an example is Model 0817 manufactured by Jeco.

Accordingly, battery power may be used in the manner described to energize the clock spring 80 which in turn drives the cams which control bleed-off and consequent stroking of the main piston 30 and main valve stopper 18, with desired selective timing, all automatically.

FIG. 8, shows an example of an auxiliary control unit, including second valving means 169 projecting for installation and movement in a second valve body 170, thereby to control water flow to at least one other outlet in the system (as for example sprinklers 171 in line 172 connected with body 170). FIG. 8 also shows an example of second control means adapted to be mounted on the valve body 170 and operatively connected to the first control means (as represented in FIG. 4, for example) to cycle the movement of the second valving means in response to operation of the first control means. Elements corresponding to those in FIG. 4 are identified by the same numbers, and include second stopper 18, stem 19, second piston 30, seal 30a, chambers 36 and 36a, bore 28 and passage 31. As before, the upper limit of stopper travel is defined by engagement of the limit 180 on piston 30 with head 181 confined by spring 150.

The second or auxiliary control means is typically operable in response to bleeding of water pressure supplied to the first piston 30 in FIG. 4, to in turn bleed water pressure supplied to the second piston 30 of FIG. 8, for effecting cycling of the second piston to open the second valve stopper. In the example, the auxiliary control means includes a control valve 182, a rotary cam 183 and cam follower 184. FIG. 9 illustrates means 186 to effect rotation of the cam, in response to communication of change in bleed pressure via line 185 from the first control means in FIG. 4, to displace the follower 184 for operating valve 182 (i.e., unseating valve 182 relative to seat 182a when cam recess 183a receives the follower). The referred to means 186 is shown to include a clock drive mechanism 187 adapted to be electrically connected with dry cell battery 188 for energizing the mechanism to rotate shaft 189 that turns cam 183. The latter rotates once every 4 hours and is adjustable on shaft 189 by selector 190 so that dwell time of follower 184 in cam recess 183a may be controlled, to control watering time interval, say between 0 and 60 minutes per revolution of cam 183. Indicia relative to which selector 190 is turned may be carried on plate 191 which turns with shaft 189. Cam 183 and selector 190 may be coupled via friction drive mechanism associated with the shaft, for example.

Means to initiate operation of the drive mechanism 187 includes a clock starting cam 192 also carried by shaft 189 and operable upon momentary turning of the shaft to close contact 193 against contact 194. Such closure connects battery 188 in series with clock drive mechanism 187 via leads 195–200, and drive continues until recess 192a again registers and receives contact actuating follower 201 in the position shown.

Momentary turning of shaft 189 is effected in response to transmission of a drop in back pressure in bleed duct 199 via line 185 to an actuator piston 203 in cylinder 204. That piston (normally urged to the right by bleed pressure) then momentarily travels to the left under the influence of compression spring 210 to cause a finger 205 on stem 206 to close turn-on switch arm 207 against contact 208, momentarily connecting battery 188 in series with clock drive mechanism 187 via leads 195, 209, 199, and 200. Accordingly, the master and auxiliary controllers are operated in sequence, bleed pressure dropping in line 185 when the master unit has completed its watering cycle. A line 185a connecting with passage 199 in the auxiliary unit of FIG. 8 may extend to another and similar auxiliary unit to effect operation thereof when the unit seen in FIG. 8 has completed its watering cycle.

FIG. 10 shows an improved form of valve 182 used in the FIG. 8 auxiliary unit. A body 215 in threaded at 217 for retention in housing 216, with sealing at 218. Follower 184 is shown in the up-position (valve open) with stem 219 spaced at 220 from closure ring 221, thereby to allow water to bleed via porting 222–224 to duct 198 (seen in FIG. 8). A compression spring 225 urges stopper ring 221 downwardly in bore 226 and against a 0-ring seal 227. When the follower is depressed by the cam 183, stem 219 moves downwardly as seen in FIG. 10a to diminish the gap 220, whereby water pressure diminishes at the gap and pressure displaces ring 221 upwardly against shoulder 228, as seen in FIG. 10a. Such pressure also displaces the 0-ring upwardly to seal off between the stem and ring. When the follower moves upwardly to FIG. 10 position, spring 225 urges the rings 221 and 227 downwardly to FIG. 10a position.

In FIG. 9, a manual overside switch 240 is closable to initiate cycling of the auxiliary unit, whenever desired.

Finally, metering rods 230 project in passage 31 in stems 19, with clearance, the stems being movable relative to such rods, thereby to maintain the passages free of clogging by or collection of foreign particles carried in the system water flow.

Figure 12:
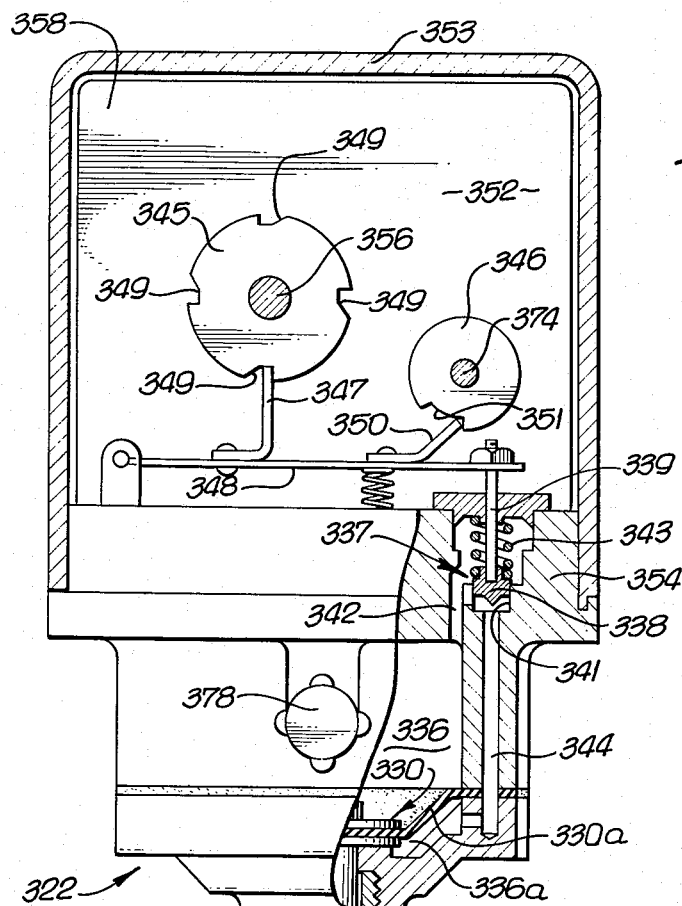
FIG. 12 is a side elevation of the FIG. 11 controller taken at 90° thereto, and partially broken away to show certain interior details.
Figure 13:
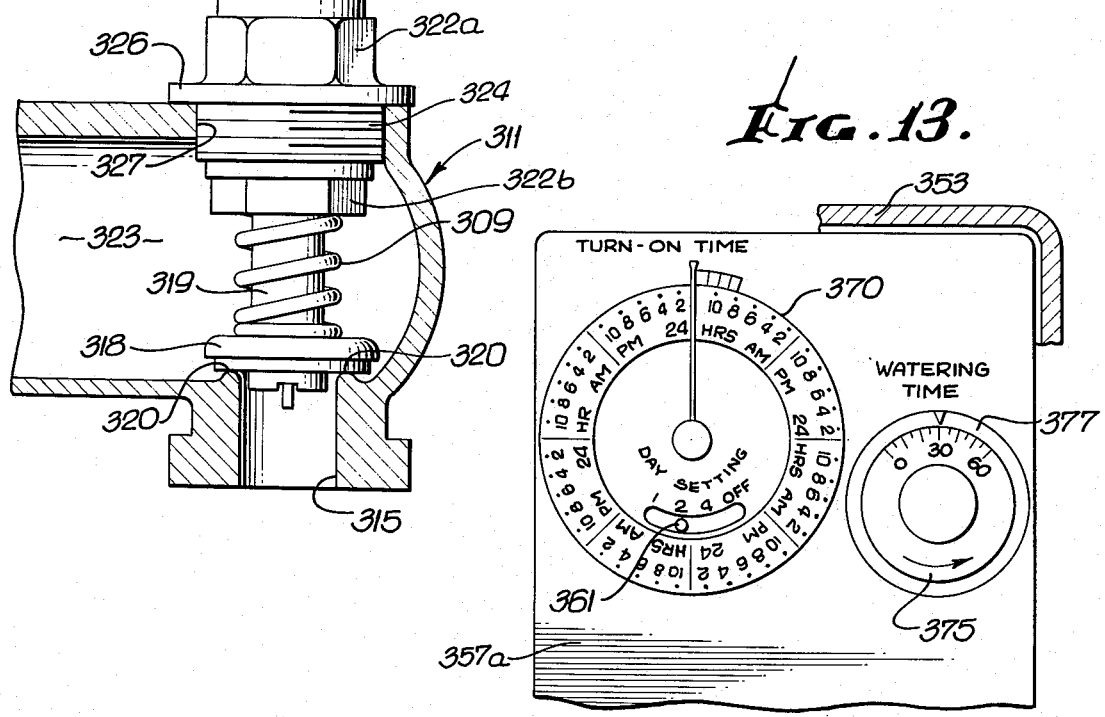
FIG. 13 is a side elevation taken on lines 13—13 of FIG. 11.

Referring now to FIGS. 11–13, and as before, a pressurized water supply system may include a water delivery line 310, a main valve body 311 through which water flow is to be controlled, a line 312 to which the water flows from body 311, and suitable water sprinklers connected with line 312.

Body 311 may have an inlet 315, an intermediate side outlet 316 and a subsequent final outlet. Water flow through the inlet 315 to outlet 316 may be controlled by a stopper 318 mounted on a stem 319 for movement toward and away from engagement with an annular seat 320 in body 311.

A control housing 322 is removably attached to body 311 (after removal of an existing manually actuated stopper and plug); valving means projects from the housing 322 for installation and movement within the body to control water flow in the system; and, control means is carried by the housing 322 and is operable to cycle the movement of the valving means at predetermined time intervals.

More specifically, the valving means may include the stopper 318 on stem 319, and which is received in the body chamber 323 in response to thread connection at 324 of the housing extension 322a to body 11. Extension 322a is connected with housing 322 via retainer 322b and projects therefrom as shown, a flange 326 engaging the body 311. Thus, the controller may be quickly attached to body 311 after removal of a usual cap engaging body thread 327. Retainer 322b contains a bore 328 within which stem 319 is vertically movable, with clearance.

The control means as referred to may advantageously include an actuator diaphram or piston 330 carried in the housing to receive application of system water pressure, the piston being centrally connected with the stem 319, and peripherally retained by the housing at 330b. For simplicity, system pressure may be supplied to piston face 330a via passage 331 extending through the stem from inlet 332 to outlet 333 formed by tubular part 333a; accordingly, system water pressure is always exerted on diaphragm or piston face 330a, so that the latter urges the stopper toward engagement with the seat 320 to maintain the valve in closed position or condition.

The piston and stopper also have a main valve opening position or positions, and in which system water pressure applied to the stopper urges the stopper, piston, and stem to open position. At such predetermined or controlled times, the water pressure exertion on face 330a is reduced, so that the differential pressure exerted on the stopper and piston is in an upward direction. For this purpose, the control means includes control valving communicating with the piston in the housing and operable to bleed water pressure supplied to the piston face 330a. In this regard, the outlet 333 from the bore in part 333a may act as a flow regulating orifice, dropping the pressure of water flowing via the stem to the chamber 336 to which the piston face 330a is exposed. In the absence of such bleed, water pressure in chamber 336 and return spring 309 (acting between the stopper 318 and retainer 322b) urge the piston and stopper to down or closed position.

The referred to control valving is shown to include a pilot or control valve 337 operable to control the slow bleed to occur during selected time intervals, as for example during a certain interval occuring once each day (or portion thereof), or every other day, or once every fourth day, etc. Valve 337 is shown in the form of a poppet 338 on a stem 339 and working in a bore 341 communicating with chamber 336 via duct 342. A spring 343 urges poppet 338 downwardly, and poppet 338 then blanks leakage of water via duct 342 to duct 344.

The control means also includes rotary cam and follower structure and a transducer device responsive to electric battery current to effect rotation of the cam structure to displace the follower structure for operating the control valving. Such control means may also include a spring biased actuator operatively connected between the follower structure and the control valving, the actuator biasing the follower structure into engagement with the rotary cam structure and having an advanced (i.e. lowered, for example) position in which the control valving is closed to shut off the bleed, and a retracted (i.e. elevated, for example) position in which the control valving is open to pass the bleed.

In the FIG. 12 example, the cam structure includes first and second rotary cams 345 and 346 rotatable at different angular rates, and the follower structure includes a first follower 347 engageable with the first cam 345 to allow retraction of the spring biased actuator arm 348 (on which the follower is mounted) during a dwell interval of first cam rotation. That dwell interval is defined by dwelling of the follower tip in a cam recess 349. The follower structure also includes a second follower 350 engagable with the second cam 346 to allow retraction of the actuator arm (on which follower 350 is also mounted) during a dwell interval of second cam rotation, so that retraction of the actuator only occurs when the dwell intervals of both followers overlap. Cam 345 may be a "multiple-day" cam, meaning that the follower 347 dwells in a recess 349 only 1 day (or part thereof) out of each several days. Cam 346 is rotated once every few hours (as for example 4), so that follower 350 dwells in recess 351 only for a limited time period each few hours (as for example 1 hour each 4 hours). Accordingly, pilot valve 337 is open for only a few hours spaced apart during 1 day out of each group of several days. From passage 344, bleed water is returned to chamber 323 via chamber 336a and clearance 355 between stem 319 and bore 328. Note that the cam and follower structure is contained within a chamber 352 defined by a housing cap 353 directly above chamber 336, and separated therefrom by housing wall structure 354.

Referring back to cam 345, FIG. 11 shows mounting thereof on a shaft 356 in the housing 353. Cam 345 has four recesses 349 spaced at 90° interval, and when all are disposed to receive the follower, the cam operates as a "1-day" cam. A control plate 357, rotating with the cam, is also controllably rotatable relative thereto (as by manually operable stem 361) to selectively cover two opposed recesses 349, or three of the four recesses. If the former, the cam operates as a "2 day" cam, and if the latter, the cam operates as a "4 day" cam, with respect to the timing of operation of follower 347. Note that the follower 347 bridges plate 357 and the cam 345; also, the plate may have recesses therein registrable with those at 349 in the cam and lobes like those of the cam, but arranged to "cover" selected cam recesses at the sides thereof as described. Shaft 356 is mounted to a cross-piece 357a in the housing; and also to cross piece 358, and a spur gear 366 on the shaft is rotated by a gear train 367 driven by transducer device 368 via output shaft 369 thereof. An indicia indicator dial 370 is rotated relative to the marker seen in FIG. 13, to indicate the position of shaft 356, hour by hour.

The transducer drive also drives shaft 374 to which cam 346 is attached, the drive ratio being such (for example) that shaft 374 may rotate once every 4 hours. Cam 346 may be rotated on the shaft 374, in response to rotation of a watering time duration selector 375, to thereby shift it relative to the follower 348. With the angular extent of the recess 351 varying as a function of axial displacement of the cam 346 (for example) it is clear that the dwell time of the follower 350 in the recess may be controlled, to control the watering time interval, say between 5 and 60 minutes per revolution of the cam 346. Selector 375 also has an "OFF" position as seen in FIG. 13 and corresponding to an axial position of cam 346 in which no recess extent 351 is presented to the follower 350, so that valve 337 does not bleed despite continued rotation of the gear train. In this regard, the marker relative to which selector 375 is turned may be carried on a plate 377 which turns with shaft 374. Cam 346 and selector 375 may be coupled via friction drive mechanism associated with the shaft 374, for example. Note mounting of shaft 374 by cross-pieces 357 and 358, in the housing.

In accordance with a further aspect of the invention, electrical battery energized transducer means 368 is operable to transmit force to effect the cycling of the single bleed valve 337 through operation of the control mechanism as described. The transducer 368 may comprise a Jeco type tuning fork clock drive, with C battery powered electromagnetic energization of a tuning fork vibrating at around 400 cycles per second. The fork "magnetically" drives an escapement wheel and reduction gear train to drive the cam. Such drives are produced by the Jeco Co. of Japan. Note D battery 425.

Accordingly, battery power may be used in the manner described to energize the transducer device which in turn drives the cams which control bleed-off and consequent stroking of the main diaphragm or piston 330 and main valve stopper 318, with desired selective timing, all automatically. From what has been said, it is clear that the valve operating arm 348 and plunger 339, and the battery operated cams 345 and 346 and followers 347 and 350 constitute one form of transducer means for operating the single control valve 338 to effect bleeding for preselected relatively short time intervals (determined by dwell of follower 350 in recess 351) during preselected relatively long time intervals (as for example determined by rotation of cam 346), within groups of longer time intervals (determined by cam 345). Also, the control means includes means (such as duration selector 375) to control the durations of short time intervals, the recurrence thereof within relatively longer time intervals being subject to control (as for example by selector 361 and control plate 357).

FIG. 11 also illustrates the provision of an adjustable stop to selectively limit travel of the piston 330 for controllably varying main valve open position of the stopper 318, to achieve flow control. As shown, a stop member 370 in the form of a plug has threaded connection at 371 to a rotary plug 372. The latter is rotatable by a manual element 373 to advance and retract the plug 370, which is axially guided by two pins 374a. Element 373 has bevel gear connection at 375a with rotary drive plug 372. In addition, a manually operable override valve means is provided on the housing 322 to control by-passing of water flow in the chamber between opposite sides of the piston 330. For example, FIG. 11 shows an override valve 377a manually retractable off seat 379 by rotary control 378, to equalize the pressure in chambers 336 and 336a to allow closing of the main valve stopper 318.

Figure 14:
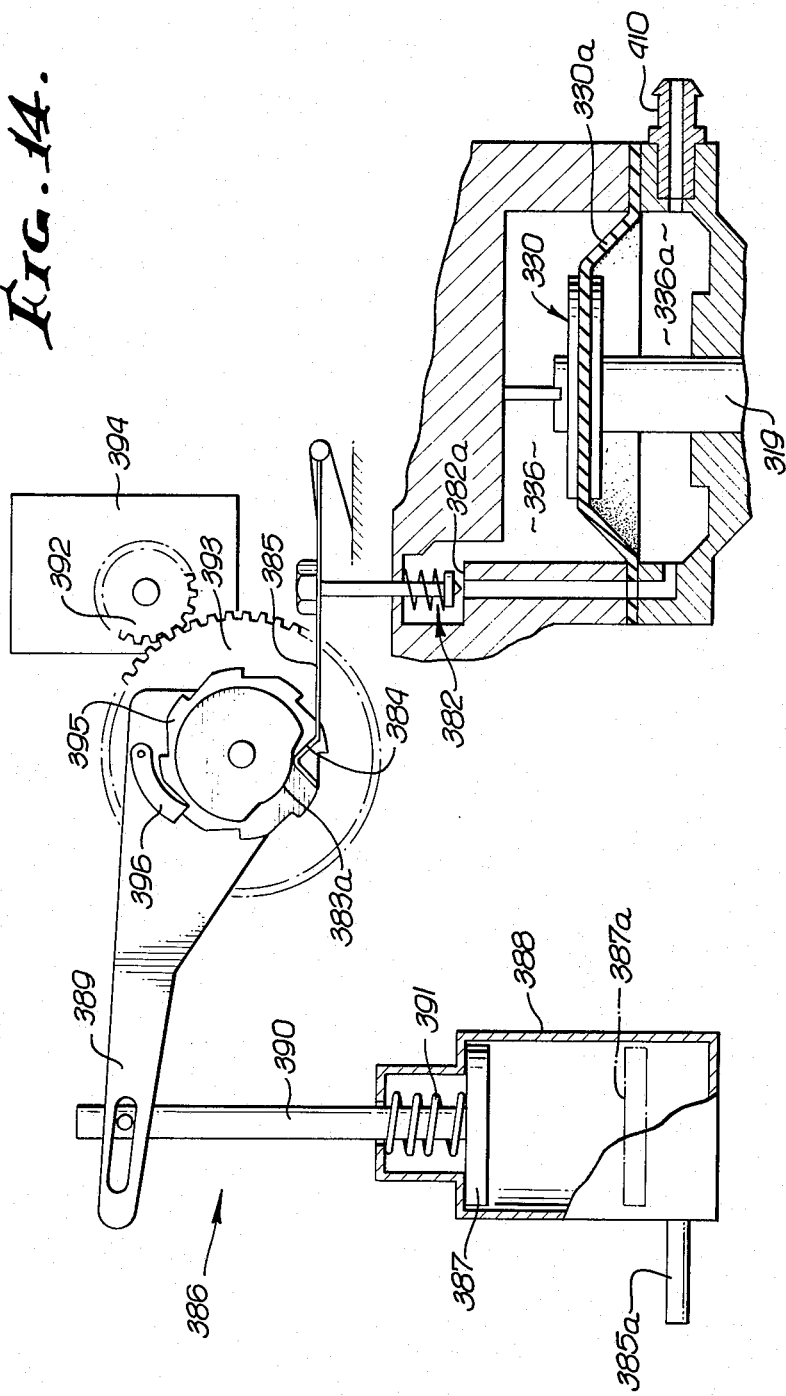
FIG. 14 is a schematic showing of the operating principles of a modified auxiliary control unit.
Figure 15:
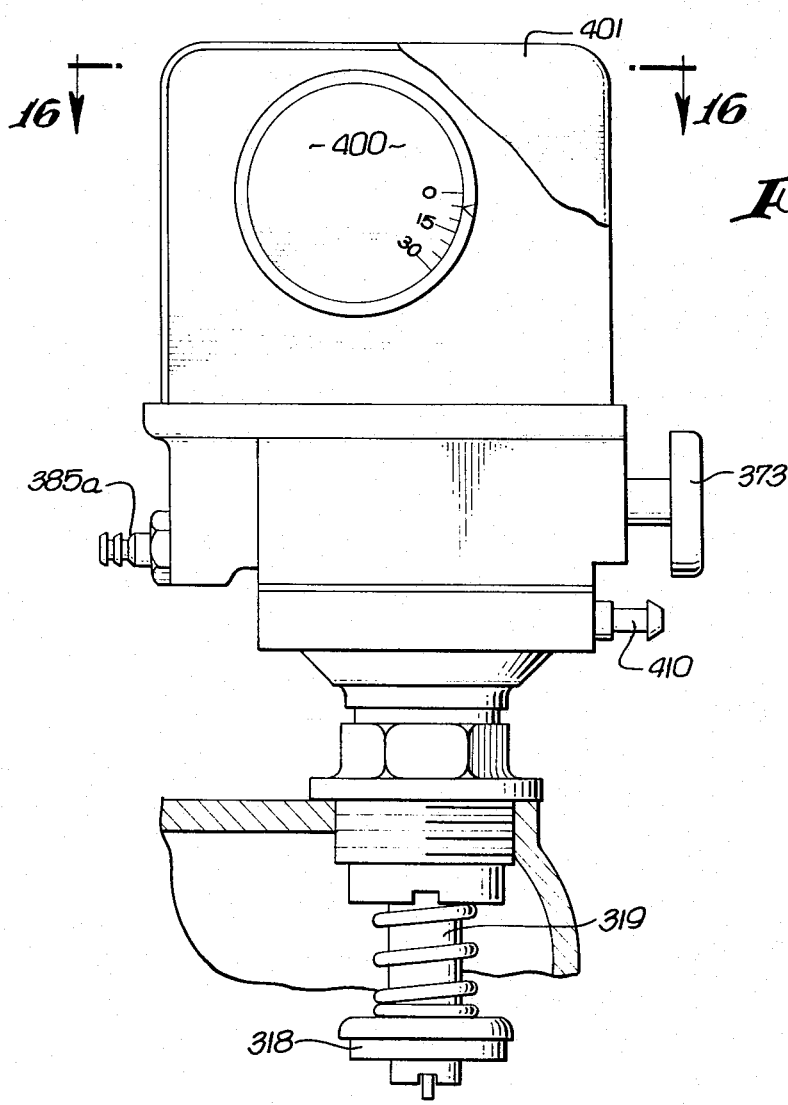
FIG. 15 is an elevation showing the exterior of the FIG. 14 control unit, as it may be actually constructed.
Figure 16:
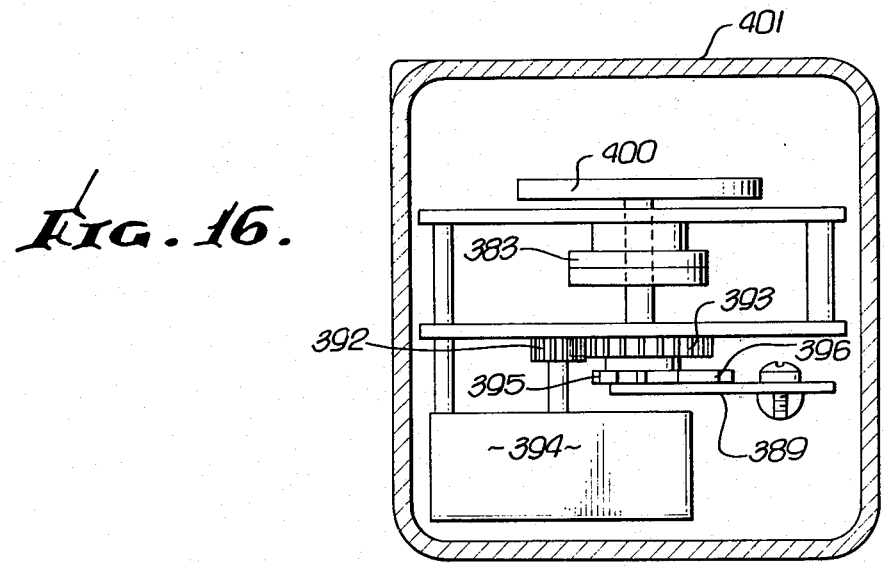
FIG. 16 is a top plan view taken on lines 16—16 of FIG. 15.

FIGS. 14–16 show another example of second control means adapted to be mounted on a valve body and operatively connected to the first control means (as represented in FIG. 11, for example) to cycle the movement of the second valving means in response to operation of the first control means. Elements corresponding to those in FIG. 11 are identified by the same numbers, and include second stopper 318, stem 319, second diaphragm or piston 330, seal 330a, and chambers 336 and 336a.

The second or auxiliary control means is typically operable in response to bleeding of water pressure supplied to the first piston 330 in FIG. 11, to in turn bleed water pressure supplied to the second piston 330 of FIG. 14, for effecting cycling of the second piston to open the second valve stopper. In the example, the auxiliary control means includes a control valve 382, a rotary cam 383 and cam follower 384. A spring biased actuator arm 385 is operatively connected between the follower and control valve 382. Means 386 effects rotation of the cam, in response to communication of change in bleed pressure via line 385a from the first control means in FIG. 11, to displace the follower 384 for operating valve 382 (i.e., unseating valve 382 relative to seat 382a when cam recess 383a receives the follower. Such means comprises a control piston 387 movable in a cylinder 388 and communicating with line 385a, and a lever arm 389 coupled to the piston shaft 390 to be responsive to sudden upward advance of the piston to rotate the cam, as for example to the position shown. A return spring 391 urges the piston in a downward retraction direction, to retract the arm and pivot the cam in order to close valve 382 following a reduction in the water pressure communicated to the piston.

Mechanism is provided to retard such retraction to define a sprinkling time interval, and may advantageously include a wind-up spring and escapement unit 394 providing torque at gear 392 engaging reduction gear 393; and a ratchet wheel 395 coupled to gear 393, and a pawl 396 coupled to arm 389 and engaging the ratchet wheel 395. The escapement provides for slow return or retraction of the piston 387 to down position (indicated at 387a) and concomitant slow closure of the valve 382 for slow turn-off of the auxiliary sprinkling system. Only after the piston has approximately reached position 387a does the follower 384 climb out of cam recess 383a (upon counter-clockwise rotation of the cam as governed by the clock) to close the valve. The pawl and ratchet wheel de-couple the piston from the escapement on up-stroking of the piston.

Cam 383 is adjustable, as by an adjustment knob 400 on the exterior of housing 401 containing the above described structure (as better seen in FIG. 16) in order to control the return travel of the cam governing the time duration of open condition of valve 382, for sprinkling time control. An hydraulic take-off from the chamber 336a to the next auxiliary unit is shown at 410.

We claim:
1. For use in a pressurized water supply system including a main valve body through which water flow is to be controlled, the combination comprising:
   a. main valving means including a stopper projecting for installation and movement in the body to control water flow in the system, and
   b. control means adapted to be mounted on the body and operable to cycle the movement of said main valving means at predetermined time intervals, the control means including an actuator piston connected with the stopper and carried to receive application of said pressure,
   c. the control means including a single control valve communicating with the upper side of the piston and operable to bleed water pressure supplied to the piston at times when the piston is in a position in which system water pressure urges the stopper and piston to main valve open position, d. said control means including rotary cam and follower structure comprising multiple cams rotatable at different rates and followers engageable therewith, transducer means responsive to battery current to effect rotation of the cam structure to displace the follower structure, and a spring biased actuator operatively connected between the follower structure and the control valve, the actuator biasing the follower structure into engagement with the rotary cam structure and having an advanced position in which the control valve is closed to shut off said bleed and a retracted position in which the control valve is open to pass said bleed.

2. The combination of claim 1 including a housing and said stopper carried by a stem projecting from a fitting on the housing adapted for connection to said main valve body, the stem extending in upright position, and the housing defining a control chamber above said piston and containing said structure and transducer device.

3. The combination of claim 2 wherein said battery is in said chamber.

4. The combination of claim 3 wherein said control valving is carried in a bore in the housing generally beneath said chamber.

5. The combination of claim 2 including said main valve body to which said fitting is connected.

6. The combination of claim 1 including an adjustable stop to selectively limit travel of the piston for controllably varying main valve open position of the stopper.

7. The combination of claim 6 including a housing defining a piston chamber, said stop having threaded connection to structure in said chamber to be adjustable toward and away from the piston in said chamber, and there being a manual control operatively connected with the stop and exposed at the housing exterior to be moved for adjusting the stop.

8. The combination of claim 1 including a housing defining a piston chamber, and manually operable override valve means on the housing to control by-passing of water flow in the chamber between opposite sides of said piston.

9. The combination of claim 2 including clearance defined between the stem and a bore in the housing to return bleed water to a chamber in the body receiving the stopper.

10. For use in pressurized water supply system including a main valve body through which water flow is to be controlled, the combination comprising a. main valving means including a stopper projecting for installation and movement in the body to control water flow in the system, and b. control means adapted to be mounted on the body and operable to cycle the movement of said main valving means at predetermined time intervals, the control means including an actuator piston connected with the stopper and carried to receive application of said pressure, c. the control means including a single control valve communicating with the piston and operable to bleed water pressure supplied to the piston at times when the piston is in a position in which system water pressure urges the stopper and piston to main valve open position, d. said control means including rotary cam and follower structure comprising multiple cams rotatable at different rates and followers engageable therewith, a transducer device responsive to battery current to effect rotation of the cam structure to displace the follower structure, and a spring biased actuator operatively connected between the followers and the control valve, the actuator biasing the followers into engagement with the rotaty cams and having an advanced position in which the control valve is closed to shut off said bleed and a retracted position in which the control valve is open to pass said bleed.

11. For use in a pressurized water supply system including a main valve body through which water flow is to be controlled, the combination comprising a. main valving means including a stopper projecting for installation and movement in the body to control water flow in the system, and b. control means adapted to be mounted on the body and operable to cycle the movement of said valving means at predetermined time intervals, the control means including an actuator piston connected with the stopper and carried to receive application of said pressure, c. the control means including control valving communicating with the piston and operable to bleed water pressure supplied to the piston at times when the piston is in a position in which system water pressure urges the stopper and piston to main valve open position, d. the control means also including rotary cam and follower structure and a transducer device responsive to electric battery current to effect rotation of the cam structure to displace the follower structure for operating the control valving, e. said control means also including a spring biased actuator operatively connected between the follower structure and the control valving, the actuator biasing the follower structure into engagement with the rotary cam structure and having an advanced position in which the control valving is closed to shut off said bleed and a retracted position in which the control valving is open to pass said bleed, f. said cam structure including first and second rotary cams rotatable at different angular rates, and said follower structure includes a first follower engageable with the first cam to allow retraction of the actuator during a dwell interval to first cam rotation, and a second follower engageable with the second cam to allow retraction of the actuator during a dwell interval of second cam rotation, so that retraction of the actuator occurs only when said dwell intervals overlap.

12. The combination of claim 11 including a housing, and said stopper carried by a stem projecting from a fitting on the housing adapted for connection to the main valve body, the stem extending in upright position and the housing defining a chamber above the piston and containing said cam and follower structure and said actuator.

13. The combination of claim 11 wherein said control valving comprises a single valve operatively connected with said actuator.

14. The combination of claim 11 wherein the first cam has four recesses spaced at 90° intervals to receive the follower, and including a control plate also having recesses to register with the cam recesses and lobes to register with selected cam recesses thereby to block follower entrance into said selected recesses.

* * * * *